(12) United States Patent
Wallace et al.

(10) Patent No.: US 9,873,419 B2
(45) Date of Patent: Jan. 23, 2018

(54) BRAKE MONITORING ASSEMBLY FOR A RAIL SYSTEM

(71) Applicant: Indian Head Industries, Inc., Charlotte, NC (US)

(72) Inventors: Thomas Edward Wallace, Charlotte, NC (US); Mark David Chandler, Bloomfield, NY (US); Richard J. Rink, Charlotte, NC (US); Andrew Schartner, Charlotte, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 14/801,194

(22) Filed: Jul. 16, 2015

(65) Prior Publication Data

US 2016/0107631 A1    Apr. 21, 2016

Related U.S. Application Data

(60) Provisional application No. 62/025,566, filed on Jul. 17, 2014.

(51) Int. Cl.
*B60T 17/22* (2006.01)
*B60T 13/66* (2006.01)

(52) U.S. Cl.
CPC .......... *B60T 17/228* (2013.01); *B60T 13/665* (2013.01)

(58) Field of Classification Search
CPC ........ B60T 17/228; B60T 13/665; B60T 8/17; B60T 8/1705
See application file for complete search history.

(56) References Cited

U.S. PATENT DOCUMENTS

2011/0308897 A1*  12/2011  Wallace .................. F16D 65/28
                                                                188/1.11 R
2014/0244080 A1*   8/2014  Herden ................. B60T 17/228
                                                                701/19

* cited by examiner

*Primary Examiner* — Vishal R Sahni
(74) *Attorney, Agent, or Firm* — Warner Norcross & Judd LLP

(57) ABSTRACT

A brake monitoring assembly and method for monitoring a brake system of a train includes a plurality of train bogeys supporting each train car, each bogey having a wheel axle supporting wheels engaging a train track. Each wheel axle includes a tread brake and a disc brake. A tread brake actuator includes an extendable tread brake pushrod for actuating the tread brake. A disc brake actuator includes an extendable disc brake pushrod for actuating the disc brake. A pneumatic system provides pneumatic pressure for actuating the brakes and includes a sensor for monitoring pressure. Each brake actuator includes a sensor for detecting length of extension of a pushrod. A controller identifies a condition of the actuators when the pressure detected by the sensor is inconsistent with a length of extension of any of the pushrods and signals an indicator for indicating a condition of the actuators.

20 Claims, 4 Drawing Sheets

BRAKE MONITORING ASSEMBLY FOR A RAIL SYSTEM

PRIOR APPLICATIONS

The present application claims priority to United States Provisional Patent Application No. 62/025,566 filed on Jul. 17, 2014.

TECHNICAL FIELD

The present invention relates generally toward a brake system of a train. More specifically, the present invention relates toward monitoring a condition of a brake actuator assembly of a train.

BACKGROUND

Rail transit systems require complex braking assemblies to stop and slow down trains without risk of the train derailing. For example, an engine pulling a large number of rail cars, sometimes extending up to a mile, must correlate the braking energy. If a rail car at the rear of a train brakes too quickly, the rail car can separate from the train. Alternatively, if a rail car at the rear of a train does not brake rapidly enough, it could compress the rail cars causing derailment. Each rail car is typically supported by front and rear bogies or trucks. Each bogey includes two axles, each of which include opposing wheels supporting the bogey upon the rail. Each axle also typically includes two brake assemblies, a tread brake and a disc brake. The tread brake applies a tread brake pad to the train wheel and a disc brake applies a disc brake pad to a disc. Each of these brake assemblies function simultaneously to efficiently stop a train.

Remarkably, the condition of the brake assemblies have never previously been monitored via sophisticated electronic monitoring systems. To date, a manual inspection of each train bogey is performed to determine if the tread brake assemblies and the disc brake assemblies are functioning properly. In fact, there presently does not exist a method for monitoring these brake assemblies while a train is in transit. Therefore, it would be desirable to provide an assembly and method of monitoring the brake assemblies of a train.

SUMMARY

A monitoring assembly and method for monitoring a condition of a tread brake actuator and a disc brake actuator disposed upon a plurality of interconnected cars of a train being pulled by a train engine is disclosed. A plurality of train bogies support each of the train cars. Each of the train bogies include a wheel axle having opposing wheels engaging a train track. The wheel axle includes a tread brake and a disc brake. A tread brake actuator having an extendable tread brake pushrod actuates the tread brake. A disc brake actuator includes an extendable disc brake pushrod for actuating the disc brake. A pneumatic system provides pneumatic pressure to the tread brake actuator for actuating the tread brake and provides pneumatic pressure to the disc brake actuator for actuating the disc brake. The pneumatic pressure is monitored by a pneumatic pressure sensor assembly. A tread brake actuator sensor detects a length of extension of the tread brake pushrod and a disc brake actuator sensor detects a length of extension of the disc brake pushrod. A controller is electronically connected to the tread brake actuator sensor, the disc brake actuator sensor and the pneumatic sensor. The controller identifies a fault condition of the tread brake actuator and the disc brake actuator when the pneumatic pressure detected by the pneumatic sensor is inconsistent in length of extension of the tread brake pushrod or the disc brake pushrod. An indicator indicates a condition of the tread brake actuator and the disc brake actuator.

The monitoring assembly of the present invention provides a highly technical manner in which to monitor if the brake system, including whether the tread brake actuator and the disc brake actuator, is functioning properly. The monitoring assembly of the present invention works both while the train is traveling and prior to departure of the train enabling continuous monitoring of the condition of the brake assembly of the train.

BRIEF DESCRIPTION OF DRAWINGS

Other advantages of the present invention will be readily appreciated as the same become better understood by reference to the following detailed description when considered in connection with the accompanying drawings, wherein.

DETAILED DESCRIPTION

Figure 1:
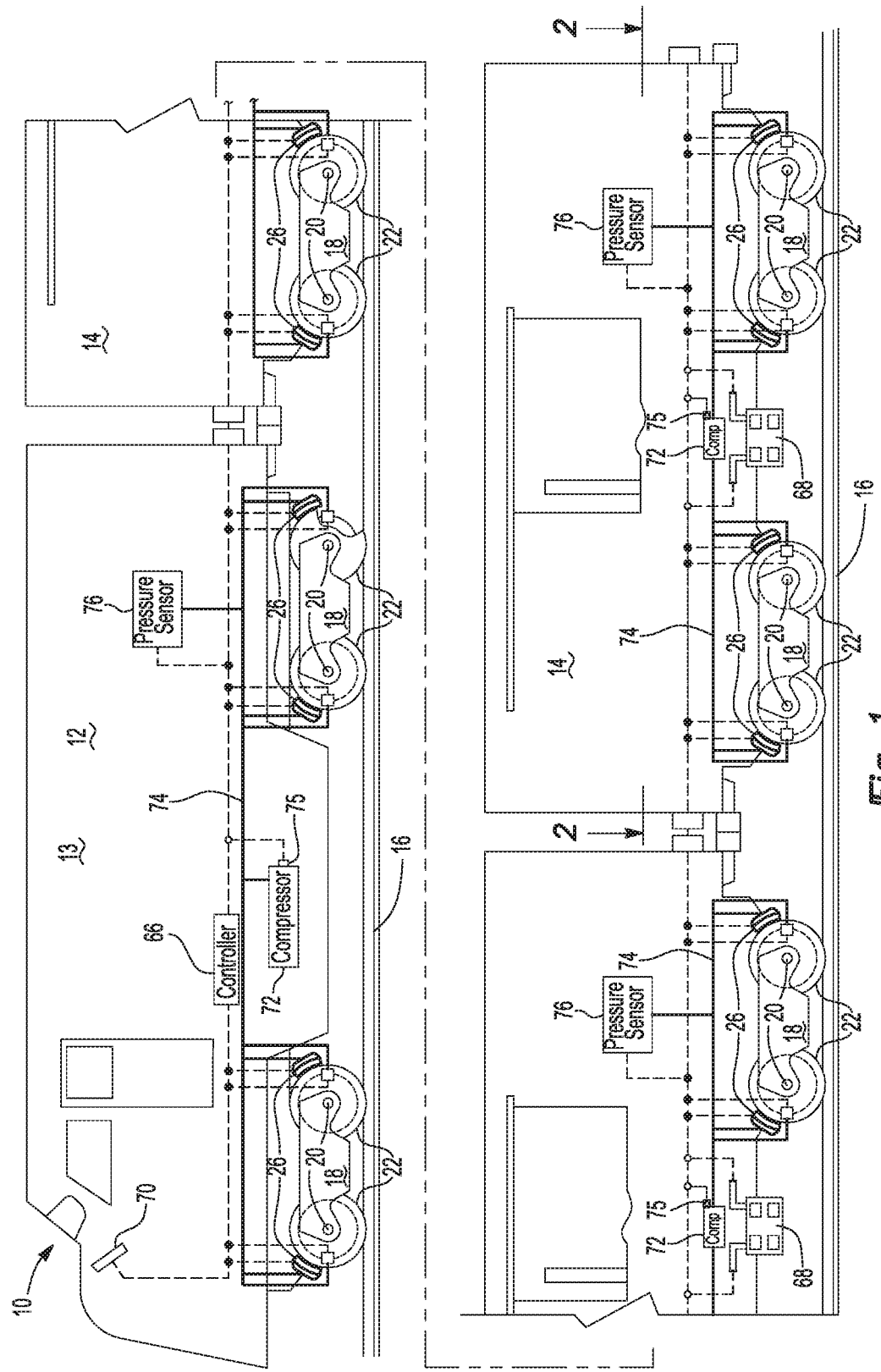
FIG. 1 shows a schematic of the monitoring assembly of the present invention.

Referring to FIG. 1, a schematic of a monitoring assembly for monitoring a condition of a brake system of a train is generally shown at 10. A train 12 includes a train engine 13, a plurality of interconnected train cars 14 subject to the motive force of the train engine 12 as shown on a rail 16 of a rail line.

Figure 2:
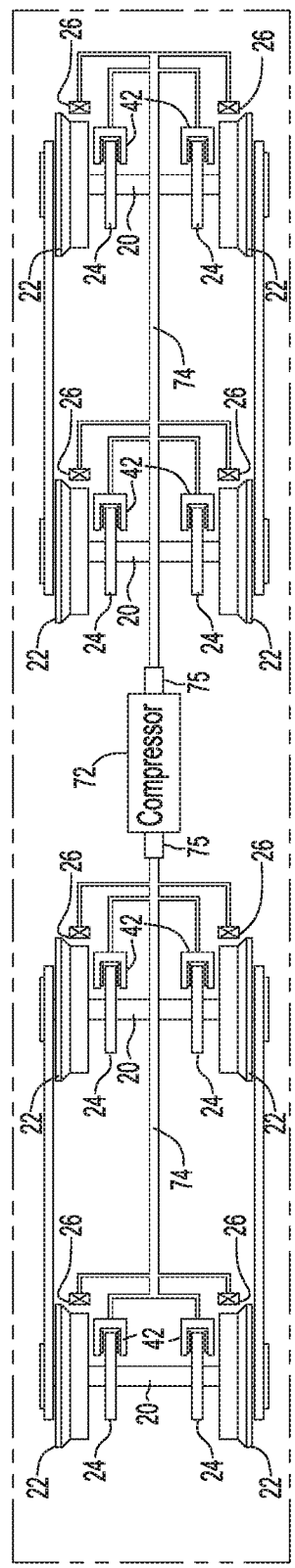
FIG. 2 shows schematic of the axles and pneumatic system.

At least two bogies 18 are disposed beneath each of the plurality of cars 14 and the engine 12 to support the train 12 upon the rails 16. Each bogey 18 includes two or more axles 20, each of which include opposing wheels 22 that engage one of the rails 16 forming the rail line. Each axle 20 also includes a disc 24 or plurality of discs 24 disposed between the opposing wheels 22 as best seen in FIG. 2, the purpose of which will be explained further herein below. For clarity, only one of the discs 24 are shown in FIG. 1. It should be understood by those of ordinary skill in the art that each of the axles 20 include a disc 24 or plurality of discs 24.

Figure 5:
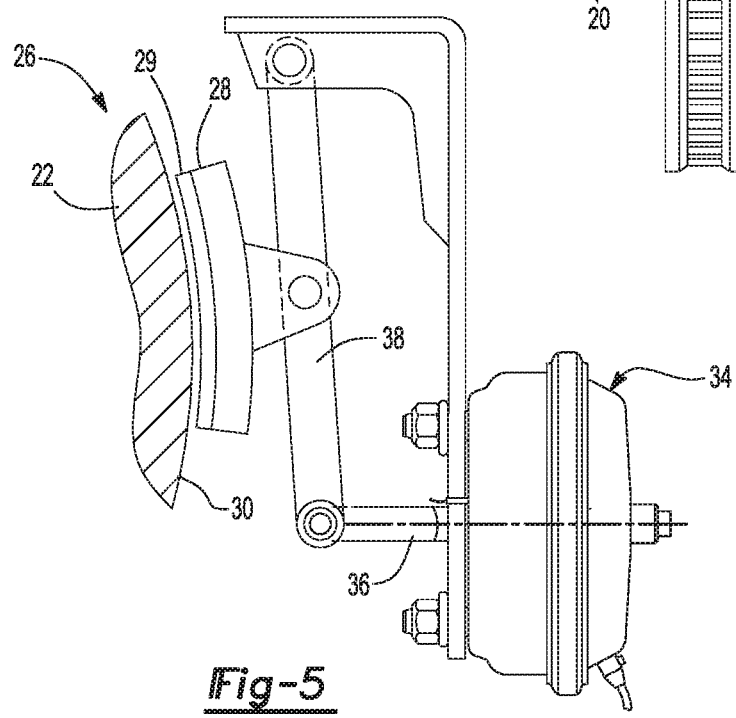
FIG. 5 shows a tread brake assembly and tread brake actuator.

Each wheel includes a tread brake assembly generally shown at 26 as best represented in FIG. 5. Each tread brake assembly includes a tread brake shoe 28 having tread brake pad 29 that engages wheel tread 30 for the purpose of slowing rotation of the wheel 22 in a known manner. A tread brake actuator 34 includes a pushrod 36 that is fixedly or pivotally attached to a lever arm 38 onto which the brake shoe 30 is mounted. The pushrod 36 translates articulating motion to the brake shoe 28 by way of the lever arm 38 for engaging and disengaging the tread 30 of the wheel 22.

A tread brake diaphragm 35 is disposed in tread brake actuator 34 and separates a working chamber 37 from a tread brake pneumatic chamber 39. Pneumatic pressure is relayed into a tread pneumatic chamber 39 to cause the tread brake pushrod 36 to extend outwardly from the tread brake actuator 34 in a manner that causes the tread brake shoe 28 to contact the tread 30 of the wheel 22. Pneumatic pressure is conveyed to the tread pneumatic chamber 39 via a tread pneumatic line 41, and a tread brake return spring 47 expands to retract the tread pushrod 36 into the tread brake actuator 34 when the pneumatic pressure disposed within the tread pneumatic chamber 39 is insufficient to overcome the spring force of the tread brake return spring 47.

Figure 3:
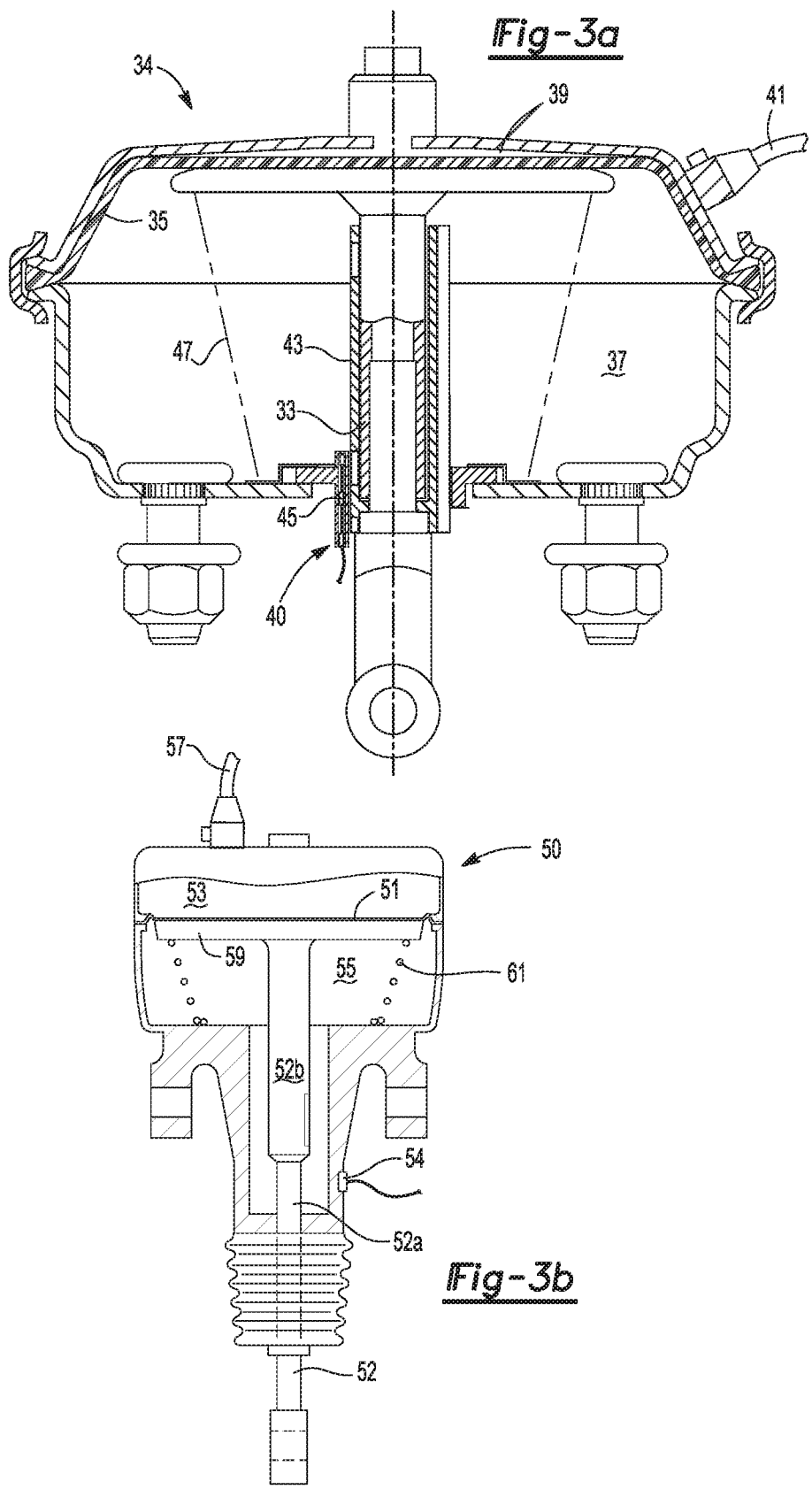
FIG. 3a shows a cross-sectional view of a tread brake actuator and tread brake sensor assembly.
FIG. 3b shows a cross-sectional view of a disc brake actuator and disc brake sensor.

The tread brake actuator 34 includes a stroke monitoring system 40 for monitoring the stroke of the tread brake pushrod 36 as best shown in FIG. 3a. The stroke monitoring system 40 provides an electronic signal indicating the length of extension of the pushrod 36 in a manner similar to that described in U.S. Pat. Nos. 6,501,375, 6,255,941, and 6,352,137, the contents of which are incorporated herein by reference. As such, the stroke monitoring system 40 for the tread brake actuator 34 includes a sensor 45 for monitoring length of extension of the tread brake pushrod 36. In this embodiment, the sensor is a hall-effect sensor, best shown in FIG. 3a, adapted to sense differences in magnetism. However, other sensors are within the scope of this invention including, but not limited to, read switches, vision sensors, infrared sensors, and equivalents. The tread brake pushrod 36 includes indicia 33 that is sensible by the sensor 45 for identifying the length of extension of the pushrod 36. In one embodiment, the indicia 33 is a magnet that is sensible by the hall-effect sensor 45 and the magnet is fixedly disposed in a sleeve 43 that is fixedly attached to the pushrod 36 in a known position. Alternatively, if the indicia 33 takes the form of reflective components readable by an infrared or vision sensors 45 where various zones, each including differing levels of reflectivity capable of being identified by the sensor 45 are included to indicate the length of extension of the tread brake pushrod 36. U.S. Pat. No. 8,616,342, which discloses reflective indicia is incorporated by reference and included in its entirety in this application.

Figure 4:
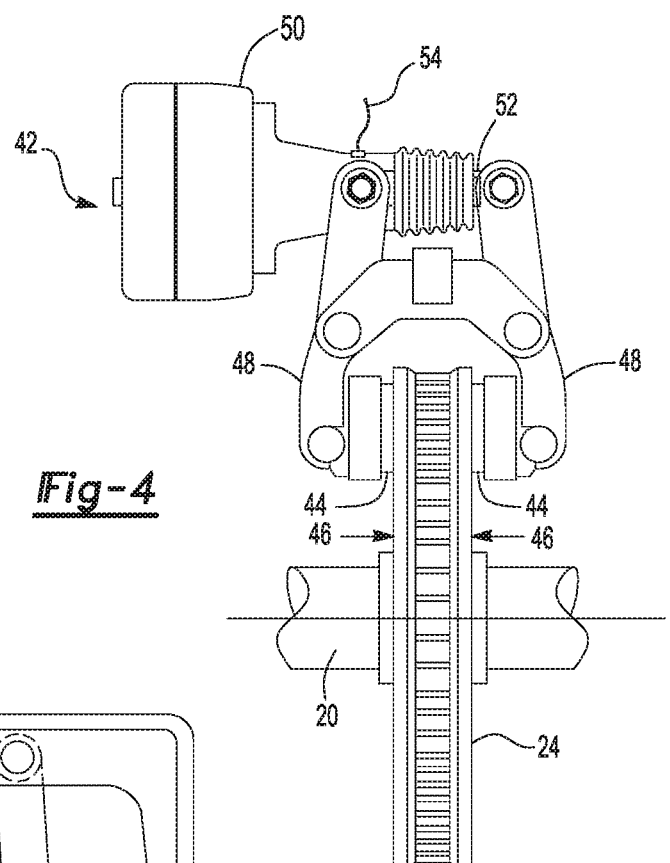
FIG. 4 shows a disc brake and disc brake actuator.

Each disc 24 includes a disc brake assembly 42 for slowing the rotation of the axle 20, and therefore the wheel 22. The disc brake assembly 42 includes opposing disc brake pads 44 that engage opposing sides 46 of the disc brake assembly 42 as best shown in FIG. 4. The brake pads 44 are moved into and out of engagement with opposing sides 46 of the disc 24 by disc lever arm 48 that are actuated by a disc brake actuator 50. The disc brake assembly 42 also acts as a parking brake when the train 10 is immobile.

Referring now to FIG. 3b, the disc brake actuator 50 includes a disc brake diaphragm 51 that separates a disc brake pneumatic chamber 53 from a disc brake working chamber 55. Pressurized air is received in the pneumatic chamber via disc pneumatic line 57 causing the diaphragm 51 to force a disc brake piston 59 to translate telescoping extension to the disc brake pushrod 52. A disc brake return spring 61 retracts the disc brake piston 59 when the pressure inside the pneumatic chamber 53 is insufficient to overcome the spring force of the return spring 61 in turn causing the disc brake pushrod 52 to retract into the disc brake actuator 50. The disc brake sensor 54 detects differences in contours of the disc brake pushrod 52 to identify the length of extension of the pushrod 52. As shown in FIG. 3b, the disc brake pushrod 52 includes a narrow diameter portion 52a and a wide diameter portion 52b, each of which is distinguishable by the sensor 54. However, it should be understood to those of ordinary skill in the art that alternative methods of sensing the length of extension of the disc brake pushrod 52 as set forth above are within the scope of this invention.

Referring again to FIG. 4, the disc brake actuator 50 is attached to a first of two disc lever arms 48. The disc brake actuator 50 includes a disc brake pushrod 52, the extension of which causes the disc lever arms 48 to articulate in manner to place the disc brake pads 44 to engage and disengage the discs 24 in a known manner. A disc brake sensor 54 is interconnected with the disc brake actuator 50 in a manner that allows the sensor 54 to identify a length of extension of a disc brake pushrod 52 as best represented in FIG. 3b. The sensor takes the form of any of a hall effect or magnetic sensor, a light sensor, a read switch, or equivalent, each of which is capable of identifying the length of extension of disc brake pushrod 52. It is contemplated by the inventor that existing physical variations of the disc brake pushrod 52 are detectable by the sensor 54.

The disc brake actuator 50 includes a diaphragm 51 separating the working chamber 55 from a pneumatic chamber 53. Pneumatic pressure is delivered to the pneumatic chamber 53 by way of a disc pneumatic line 57. It should be known to those of ordinary skill in the art, when pneumatic pressure increases in the pneumatic chamber 53, the disc brake pushrod 52 extends to actuate the disc lever arms 48 causing the disc brake pads 44 to engage the disc 24. A return spring 61 causes the disc brake pushrod 52 to retract into the disc brake actuator 50 when pneumatic pressure within the pneumatic chamber 53 drops to a level insufficient to compress the return spring 61.

Referring again to FIG. 1, a controller or electronic control unit 66 is electronically connected to each tread brake sensor 45 and to each disc brake sensor 54. The controller 66 is also electronically connected to a car display 68 at a location visible to an operator. In addition to, or alternative to the displays 68, an engine display 70 that is located in a control center (not shown) of the engine 12 so that a train conductor can monitor the display 70 during transit and during stationary inspection. The car display 68 and the engine display 70 indicate a condition of each of the tread brake actuators 34 and disc brake actuators 50. For example, a display indicates if all of the actuators 34, 50 are functioning in a normal condition. Further, the display 68, 70 indicates which of the actuators 34, 50 that are subject to a nonfunctioning condition, an over stroke condition, or a hanging brake condition.

In one embodiment, a compressor 72 is located at each car 14 for providing pneumatic pressure to each of the brake actuators 34, 50 of each car 14 via common pneumatic line 74. In an alternative embodiment, a single compressor 72 provides pneumatic pressure to each of the cars through a common pneumatic line 74. In this embodiment, the compressor 72 is located in the engine 12. The compressor 72 maintains a generally constant, reserve pneumatic pressure that is regulated by an air valve 75. Each air valve 75 receives an electronic signal from the controller 66 to either provide pneumatic pressure to the pneumatic line 74 or relieve pressure from the pneumatic line 74.

At least one pressure sensor 76 or transducer is located in the pneumatic line 74 and is electronically linked to the controller 66 to relay pressure of the pneumatic line 74 to the controller 66. It should be understood by those of ordinary skill in the art that a plurality of pressure sensors 76 could also be dispersed throughout the pneumatic line 74 to more precisely monitor fluctuations in pressure at different locations along the pneumatic line 74. The controller 66 is programmed to correlate the pressure in the pneumatic line 74 with the length of stroke of the tread brake pushrod 36 and the disc brake pushrod 52 to determine the condition of the tread brake actuator 34 and the disc brake actuator 50 respectively. For example, when the air valve 75 is signaled by the controller 66 to provide pneumatic pressure to the pneumatic line 74, each of the tread brake pushrod 36 and the disc brake pushrod 52 extend a known amount as detected by the stroke monitoring system 40 of the tread brake sensor 45 of the tread brake actuator 34 and the disc brake sensor 54 of the disc brake actuator 50. If the length of extension of the tread brake pushrod 36 and the disc brake pushrod 52 are within a normal range relative to the pneumatic pressure signaled by the pressure sensor 76, the display 68, 70 signal normal condition of the actuators 34, 50.

In an alternative embodiment, the tread brake actuator 34 and the disc brake actuator 50 each receive pneumatic pressure from a separate pneumatic line 74 for clarity, only a single pneumatic line is represented in FIGS. 1 and 2. It should, therefore, be understood by one of ordinary skill in the art that the representative pneumatic line 74 shown in FIGS. 1 and 2 also represents parallel pneumatic lines 74. When parallel pneumatic lines 74 are included, each line includes a designated pressure sensor 76 that is correlated with the tread brake sensor 45 or the disc brake sensor 54 the purpose of which is explained further herein below.

Prior to departure, a pre-trip inspection is conducted to verify all of the tread brake assemblies 26 and the disc brake assemblies 42 are functioning properly. If the brakes assemblies 26, 42 are functioning properly, an indicator, optionally disposed on the engine display 70 is activated. However, if one or more of the tread brake assemblies 26 or disc brake assemblies 42 are not functioning properly, the indicator is not activated identifying a defect. The individual displays 66 identify which of the tread brake actuators 34 or disc brake actuators 50 are not applying pressure to the tread brake pad 29 or disc brake pad 44 respectively when the air valve 75 is disposed in an open position.

If the controller 66 signals the air valve 75 to relieve pressure from the pneumatic line 74, and any of the tread brake pushrods 36 or the disc brake pushrods 52 remain in an extended position as detected by the brake monitoring system 40 via the tread brake sensor 45 or the disc brake sensor 54 respectively, the display 68, 70 will indicate a hanging brake condition signals the engineer an emergency stop is required to prevent fire or brake component damage from occurring.

When the air valve 75 is signaled by the controller 66 to provide pneumatic pressure to the pneumatic line 74 to actuate the tread brake actuator 34 and the disc brake actuator 50 and the stroke monitoring system 40 of the tread brake sensor 45 of the tread brake actuator 34 or the disc brake sensor 54 of the disc brake actuator 50 indicates a length of extension that exceeds a normal limit, the display 68, 70 indicates an over-extended pushrod 36, 52 indicating service is required.

When the air valve 75 is signaled by the controller 66 to provide pneumatic pressure to the pneumatic line 74, and the stroke monitoring system 40 of the tread brake sensor 45 of the tread brake actuator 34 or the disc brake sensor 54 of the disc brake actuator 50 detects little or no movement of the pushrods 36, 52, the display 68, 70 indicates a non-functioning brake condition requiring service.

The schematics shown in FIG. 1 are exemplary in nature. It should be understood to those of ordinary skill in the art that reference to the electric line 67 includes wireless communication between each of the sensors 40, 54, 76 and the controller 66. Furthermore, the controller 66 can be configured to communicate with a control terminal for the purpose of monitoring the condition of the brake actuators 34, 50 at a remote location. Still further, the controller 66 is also contemplated to be the train system controller that is programmed to interface with the displays 68, 70 and each of the sensors 45, 54, and 76.

During operation, each of the tread brake sensors 45 and the disc brake sensors 54 is correlated with pressure drop along the pneumatic line 74 as measured by each pressure sensor 76. As such, a pressure reading spaced a significant distance from any of the air valves 75 will be lower than a pressure reading at the compressed air source proximate the compressor 72. The controller 66 correlates distance from each air valve 75 to corresponding sensors 45, 54 and accounts for pressure drop measured by the pressure sensor 76 most near a given actuator 34, 50. Furthermore, the length of actuation of a pushrod 36, 52 located most distant from an air valve 75 or at a rear portion of the train 10 is altered from those actuators 34, 50 located at the front of the train to prevent over braking or under braking cars 14 disposed toward a rear of the train. As such, monitoring the length of extension of the pushrods 36, 52 is adjusted to account for variation in pneumatic pressure so that an error signal is not incorrectly indicated.

The controller 66 also identifies a delay in pressure reading by the pressure sensor 76 and the tread brake sensor 45 and the disc brake sensor 54 to avoid indicating false actuator defect conditions. This is particularly desirable when the distance between the pressure sensor 76 and the tread brake sensor 45 or disc brake sensor 54 is significant. Therefore, the controller correlates the distance between the sensors 45, 54, 76 along with the different braking requirements of each car 14 based upon location of the car relative to the train engine 12.

If the controller 66 identifies a pneumatic pressure in the pneumatic line 74 as signaled by the pressure sensor 76 exceeds a threshold value, an alarm or signal on the display 66, 70 is initiated. For example, a pressure in excess of 115 psi could be the result of a runaway compressor 72, regardless of the disposition of the actuators 34, 50.

Obviously, many modifications and variations of the present invention are possible in light of the above teachings. The foregoing invention has been described in accordance with the relevant legal standards; thus, the description is merely exemplary rather than limiting in nature. Variations and modifications to the disclosed embodiment may become apparent to those skilled in the art and do come within the scope of the invention. Accordingly, the scope of the legal protection afforded this invention can only be determined by studying the following claims.

What is claimed is:

1. A brake monitoring assembly for a train having a train engine and a plurality of interconnected cars supported on a track, comprising:

a plurality of train bogeys supporting each of said train cars, each of said train bogeys including a wheel axle having opposing wheels engaging the train track, said wheel axle including a tread brake and a disc brake;

a tread brake actuator having an extendable tread brake pushrod for actuating said tread brake and a disc brake actuator having an extendable disc brake pushrod for actuating said disc brake;

a pneumatic system for providing pneumatic pressure through a pneumatic line to said tread brake actuator for actuating said tread brake and providing pneumatic pressure to said disc brake actuator for actuating said disc brake with the pneumatic pressure in said pneumatic line being monitored by a pneumatic sensor assembly located in said pneumatic line;

a tread brake actuator sensor for detecting a length of extension of said tread brake pushrod and a disc brake actuator sensor for detecting a length of extension of said disc brake pushrod;

a controller electronically connected to said tread bake actuator sensor, said disc brake actuator sensor, and said pneumatic sensor assembly located in said pneumatic line and said controller distinguishing fluctuations of pneumatic pressure in said pneumatic line from an expected pneumatic pressure while for detecting a fault condition of said tread brake actuator and said disc brake actuator when the pneumatic pressure detected by said pneumatic sensor is inconsistent with a length of extension of either of said tread bake pushrod or said disc brake pushrod; and an indicator for indicating a condition of the tread brake actuator and the disc brake actuator.

2. The assembly set forth in claim 1, wherein said indicator is located on at least one of the car or the engine.

3. The assembly set forth in claim 1, wherein said controller comprises a train multiplex controller programmed to interact with said brake monitoring assembly.

4. The assembly set forth in claim 1, wherein said controller comprised a plurality of control units, each being disposed upon a separate train car.

5. The assembly set forth in claim 1, wherein said tread brake actuator and said disc brake actuator disposed on the same axle are monitored simultaneously.

6. The assembly set forth in claim 1, wherein said controller includes a transmitter for transmitting the condition of each of the tread brake actuators and said disc brake actuators communicating with said controller.

7. The assembly set forth in claim 1, wherein said controller is programmed to detect a normal condition, an overstroke condition, a hanging brake condition and a non-functioning condition.

8. The assembly set forth in claim 1, wherein said pneumatic system comprises a compressor disposed upon each of the train cars with each of said compressors providing pneumatic pressure to separate of the train cars.

9. The assembly set forth in claim 1, wherein said controller accounts for variability in pressure between interconnected train cars when identifying a condition of the tread brake actuators and the disc brake actuators.

10. The assembly set forth in claim 4, wherein said individual control units are interconnected via a train power line.

11. A method of monitoring a condition of a braking system for a train having a train engine and a plurality of interconnected cars supported on a track, comprising the steps of:

providing a tread brake assembly including a tread brake and a tread brake actuator having a tread brake pushrod actuated by pneumatic pressure;

providing a disc brake assembly including a disc brake and a disc brake actuator actuated by pneumatic pressure;

providing pneumatic pressure to said tread brake actuator having a tread brake pushrod and said disc brake actuator having a disc brake pushrod;

monitoring a length of extension of said tread brake pushrod and said disc brake pushrod and correlating the length of extension of said tread brake pushrod and said disc brake pushrod with a pneumatic pressure within a pneumatic line extending between a compressor to said disc brake actuator assembly and said tread brake actuator assembly for determining the condition of said tread brake assembly and said disc brake assembly; and identifying a faulty brake actuator condition when the pneumatic pressure disposed within said pneumatic line is inconsistent with expected length of extension of both of said tread brake pushrod or said disc brake pushrod while distinguishing fluctuations of pneumatic pressure in said pneumatic line from expected length of extension of both of said tread brake pushrod and said disc brake pushrod.

12. The method set forth in claim 11, further including the step of signaling a condition of the tread brake assembly and the disc brake assembly to a display.

13. The method set forth in claim 12, wherein said step of signaling a condition of the tread brake assembly and the disc brake assembly to a display is further defined by transmitting a wireless signal to said display.

14. The method set forth in claim 12, wherein said step of signaling a condition of the tread brake assembly and the disc brake assembly to a display is further defined by transmitting a signal to a plurality of displays.

15. The method set forth in claim 11, wherein said step of determining the condition of said tread brake assembly and said disc brake assembly is further defined by determining normal condition, an overstroke condition, a hanging brake condition and a non-functioning condition.

16. The method set forth in claim 11, wherein said step of providing pneumatic pressure to said tread brake actuator and said disc brake actuator is further defined by providing a substantially equal amount of pneumatic pressure to said tread brake actuator and said disc brake actuator through a common pneumatic line and monitoring pneumatic pressure is said common pneumatic line for correlating the length of extension of said tread brake pushrod and said disc brake pushrod with a pneumatic pressure.

17. The method set forth in claim 11, further including the step of providing a train control module and transmitting the condition of the tread brake assembly and the disc brake assembly to the train control module.

18. The method set forth in claim 11, wherein said step of monitoring a length of extension of said disc brake actuator is further defined by monitoring changes in contour along said disc brake pushrod.

19. The method set forth in claim 11, further including the step of providing a display on each of said plurality of interconnected cars.

20. The method set forth in claim 11, wherein said step of determining the condition of said tread brake assembly and said disc brake assembly is further defined by determining the condition of said tread brake assembly and said disc brake assembly on only some of the interconnected cars while not determining the condition of said tread brake assembly and said disc brake assembly on other the interconnected cars.

* * * * *